United States Patent [19]

Brosdetzko et al.

[11] Patent Number: 4,469,332

[45] Date of Patent: Sep. 4, 1984

[54] SEAL FOR A TUBULAR MILL

[75] Inventors: Hubert Brosdetzko; Wolfgang Gerster, both of Oberhausen; Klaus Müller, Dorsten, all of Fed. Rep. of Germany

[73] Assignee: Deutsche Babcock Aktiengesellschaft, Oberhausen, Fed. Rep. of Germany

[21] Appl. No.: 423,200

[22] Filed: Sep. 24, 1982

[30] Foreign Application Priority Data

Sep. 30, 1981 [DE] Fed. Rep. of Germany ....... 3138839

[51] Int. Cl.³ .......................... B02C 17/18; F16J 15/40

[52] U.S. Cl. ...................................... 277/12; 241/179; 277/74

[58] Field of Search ...................... 241/3, 27, 190, 191, 241/26, 12, 74, 179-183

[56] References Cited

U.S. PATENT DOCUMENTS

| | | | |
|---|---|---|---|
| 3,526,249 | 6/1971 | Fagelholt | 241/181 |
| 4,003,164 | 1/1977 | Carpenter et al. | 241/181 |
| 4,054,292 | 10/1977 | Stone | 241/179 |
| 4,096,666 | 6/1978 | Brown | 277/74 |
| 4,371,119 | 2/1983 | Leuthold | 241/179 |

*Primary Examiner*—Robert I. Smith
*Attorney, Agent, or Firm*—Max Fogiel

[57] ABSTRACT

A tube mill operated under superpressure in the milling chamber is sealed by means of blocking air, which is made available in a blocking air chamber (9) arranged on the stationary part of the journal (2) of the tube mill. A blocking air channel is provided between the stationary and the rotating part of the tube mill and joins the blocking air chamber (9) to the milling chamber. The blocking air channel contains an inclined extending section (19), which is arranged at an acute angle to the longitudinal axis of the tube mill.

6 Claims, 3 Drawing Figures

SEAL FOR A TUBULAR MILL

Figure 1:
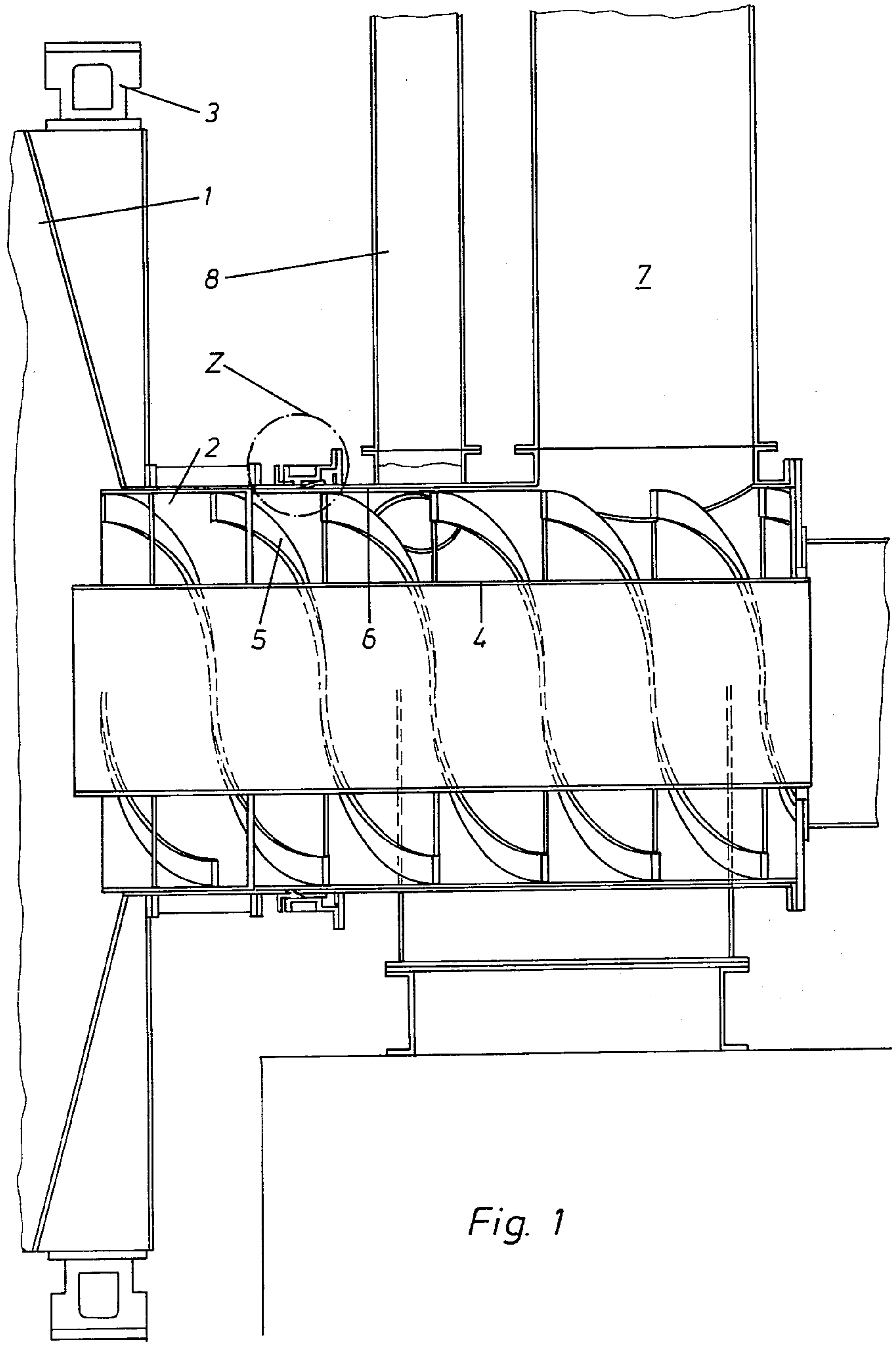

The invention relates to a seal for a tube mill operated at superpressure in the milling chamber and consisting of a drum with side hollow journals and using sliding seals.

Such tube mills can be used for milling coal. While these tube mills are operated at subpressure, a sliding seal or a stuffing box is sufficient as seal between the rotating and the stationary part of the mill. However, this seal fails if there is a superpressure in the milling chamber, because gas, loaded with dust, can be forced from the milling interior through the sliding seals to the outside. These sealing problems are increased thereby if the raw material on reduction is dried by hot gasses. In such a tube mill the parts of the mill coming into contact with the hot gasses expand for considerable amounts relative to the cold parts, in particular in the case of large drum lengths.

The invention has as object to provide an improved seal for a tube mill operated at superpressure, whereby larger heat expansion amounts are taken up by the seal.

This object is achieved in accordance with the invention thereby that a blocking air chamber is arranged on the fixed part of the tube mill, which is sealed off by means of the sliding seals relative to the rotating part of the tube mill and which is in communication with the milling chamber by means of a blocking air channel, which extends between the stationary and the rotating part of the tube mill, and that the blocking air chamber has a section, which extends at an acute angle to the longitudinal axis of the tube mill.

In this arrangement the dust loaded gas is prevented, by way of the blocking air, to pass out of the milling chamber to the outside. This effect of the blocking air prerequires a narrow blocking air channel. Otherwise the channel width is limited due to the heat expansion between the hot, rotating and the cold, stationary part of the tube mill. In the region of the inclined extending section larger expansion amounts can be taken up at lower channel width, whereby simultaneously a labyrinth effect is achieved.

Two examples of embodiments of the invention are illustrated in the drawing and are explained in more detail hereafter.

Figure 2:
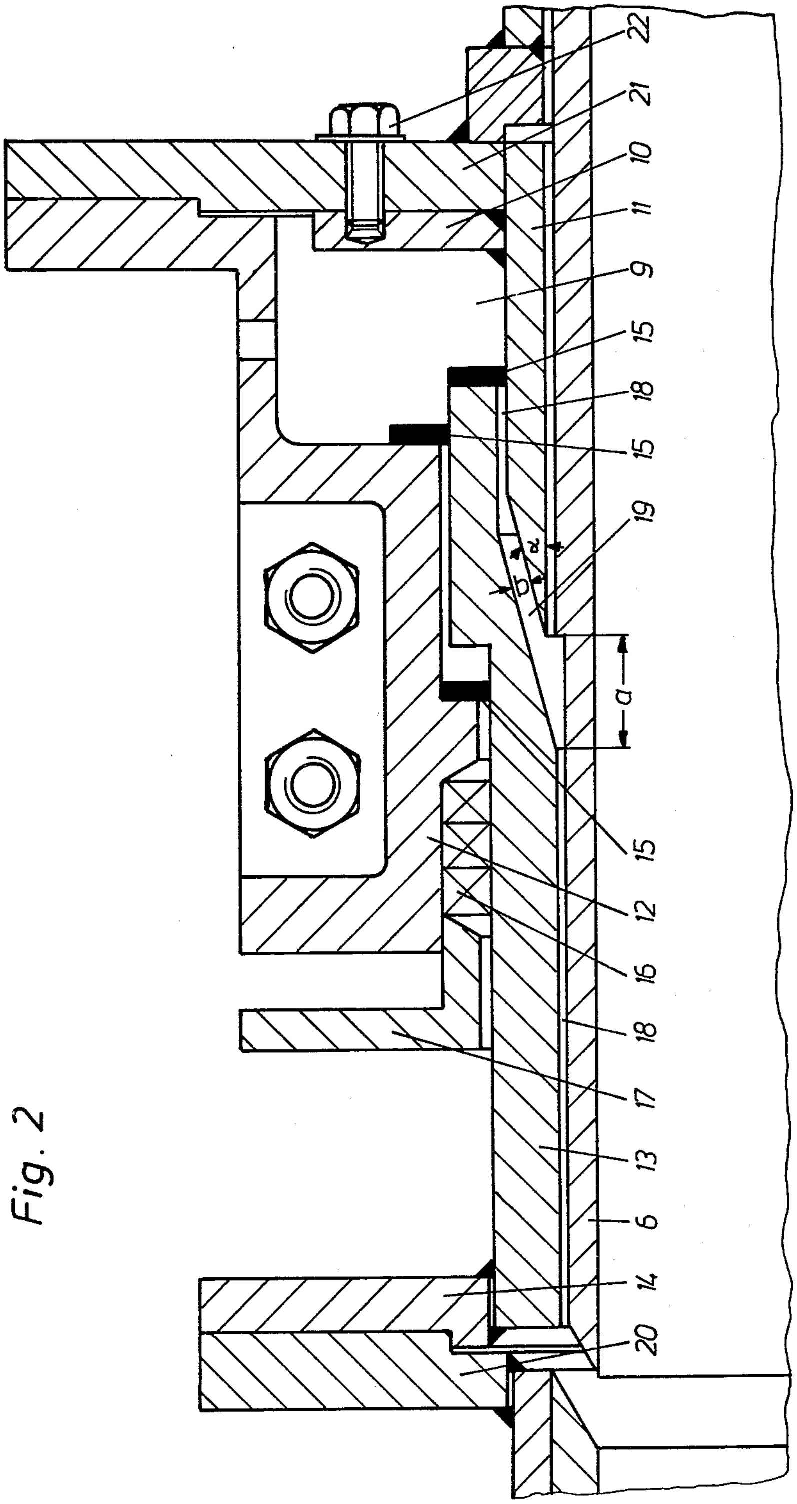
Figure 3:
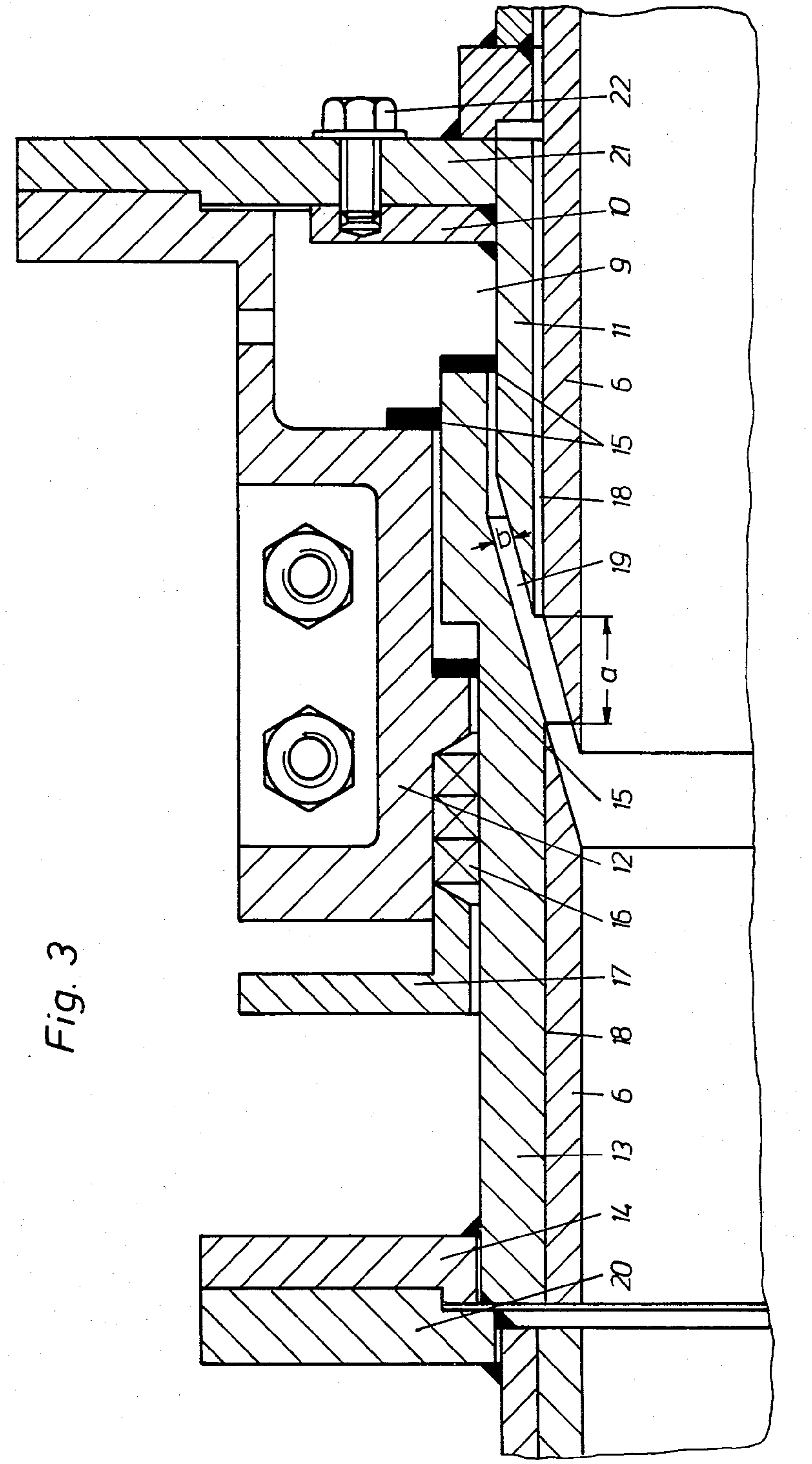

It is shown in:

FIG. 1 a longitudinal section through a tube mill which is only illustrated partially and FIGS. 2 and 3 the detail Z according to FIG. 1.

The tube mill consists of a drum 1, which is lined with milling plates and is filled with milling spheres. Two similarly formed hollow journals 2 join onto the drum 1 on both sides. The drum 1 is provided at both ends each with a ball race bearing 3. It is driven by means of a ring gear surrounding the drum 1, into which ring gear a motor driven pinion engages. This drive is generally known in tube mills and is not illustrated in more detail. A guide tube 4 is located within the pipe 2, through which the heated air is blown under pressure as drying medium and carrier gas into the milling chamber within the drum 1, the air pressure being above atmospheric pressure. The guide tube 4 is surrounded by a spiral 5, which is limited on its outer circumference by means of a wearing pipe 6.

A rising conduit 7 and a down conduit 8 are joined at the stationary part of the pipe 2, which conduits lead to a separator, which is not illustrated. The milled material is transported, together with the carrier gas, through the annular space between the guide pipe 4 and the wearing pipe 6 into the rising conduit 7. The raw material passes through the down pipe 8 into the mentioned annular space and is transported by means of the spiral 5 into the milling chamber of the drum 1.

The seal of the tube mill takes place by means of blocking air at higher pressure than the pressure in the milling chamber of the drum 1. The blocking air is supplied to a blocking air chamber 9, which annularly surrounds the journal 2, and which is arranged on the stationary part of the journal 2. The blocking air chamber 9 is limited by a side wall 10, an annular floor unit 11 and the angled extension of two ring segments 12. The side wall 10 and the floor unit 11 are rigidly connected to each other and are separably connected to the ring segments 12 by means of a disc 21. The ring segments 12 are divided in axial direction and are screwed fixedly together.

A ring plate 13 projects concentrically relative to the wearing pipe 6 into the blocking air chamber 9, which plate is connected to a flange 14, which is attached on the rotating part of the journal 2 together with the counter flange 20.

The flange 14 and the counter flange 20 are removably connected by means of bolts. Thereby the flange 14 engages into a recess of the counter flange 20 by means of a projection.

Sliding ring seals 15 are provided at the contact positions between the ring plate 13, rotating with the drum 1 and the journal 2, on the one hand, and the stationary ring segments 12 and the floor unit 11 on the other hand. The sliding ring seals 15 can consist of full rings or of ring-shaped segments. The embodiment of ring-shaped segments has the advantage of easy assembly and on wear allows an after-adjustment of the sliding ring seal. A control and subsequent working of the sliding ring seals 15 is possible because the ring segments 12 can be removed after loosening the bolts and thereby the slide ring seals 15 can be reached from the outside.

A stuffing box 16 is provided between the ring plate 13 and the ring segments 12 in addition to the slide ring seals 15. This stuffing box 16 is pressed by means of a stuffing box gland 17.

The blocking air chamber 9 is connected to the interior of the journal 2 and therewith to the milling chamber by means of a blocking air channel. The blocking air channel consists of two straight sections 18 extending concentrically to the journal 2, which are joined by means of an inclined extending section 19, which is arranged at an acute angle to the longitudinal axis of the pipe mill. The length of the straight part of the blocking air channel is a multiple larger than the length of the inclined extending section 19. The width of the straight section 18 can be adjusted in simple manner to the required width, in order to achieve a required labyrinth effect. The width of the straight section 18 therewith is smaller than the width of the inclined extending section 19. In the inclined extending section 19 the thermically dependant length variation between the warm, rotating part and the stationary part of the tube mill is noticeable. Larger length variations at smaller channel width can be taken up without difficulty due to the inclination of the inclined developing section 19. In FIG. 2 the length change is indicated by A and the channel width of the inclined extending section 19 by B. As is clear, the allowed length variation is about 6 times larger than the channel width. A labyrinth effect also is achieved by means of the inclined extending section 19.

In the embodiment shown in FIG. 3 the wearing pipe 6 is divided in the region of the seal, whereby a part of the wearing pipe 6 is connected to the ring plate 13. In this case the free carrying part of the wearing pipe 6 is shortened, so that this embodiment is recommendable for long wearing pipe 6.

The angle, at which the inclined extending section 19 of the blocking air is placed, adjusts itself at a given temperature according to the expected length expansion in the drum region.

On the other hand for space reasons it is attempted to select an angle which is not too small. In the case of long drums and high temperatures, a smaller and, in the case of short drums and low temperatures, a larger angle is applied.

The side wall 10 of the blocking air chamber 9 together with the floor unit 11 is arranged slidably relative to the disc 21 connected to the fixed stationary part of the journal 2 for adapting to the width of the inclined extending section 19. Several pressing bolts 22 are passed through the disc 21 and are held in the side wall 10 and the disc 21. By means of an adjustment of the pressing bolts 22 the width of the inclined extending section 19 can be adjusted to a value, which is just sufficient to take up the expected length variations. In addition to the described pressing bolts, the adjustment can also take place hydraulically.

We claim:

1. A seal for a tube mill operated at superpressure in a milling chamber and comprising: a drum with side hollow journals and having sliding seals; a blocking air chamber arranged on a fixed member of the tube mill and being sealed off by said sliding seals relative to a rotating part of the tube mill; said blocking air chamber communicating with said milling chamber by a blocking air channel extending between stationary and rotating parts of the tube mill; said blocking air chamber having a section extending at an acute angle to the longitudinal axis of the tube mill.

2. A seal according to claim 1, wherein said blocking air channel has an inclined extending section with a width which is adjustable.

3. A seal according to claim 2, wherein said blocking air channel has a straight section extending in a direction of the longitudinal axis of the tube mill and having a length which is equal to a multiple of the length of said inclined extending section.

4. A seal according to claim 3, wherein said straight section of said blocking air channel has a width which is smaller than the width of said inclined extension section.

5. A seal according to claim 1, wherein said fixed member of said blocking air chamber is divided axially and comprises ring segments connected removably to each other.

6. A seal according to claim 1, wherein each of two pipes in said tube mill is surrounded annularly by a blocking air chamber.

* * * * *